Patented May 11, 1943

2,319,182

UNITED STATES PATENT OFFICE 2,319,182

MOLDED ARTICLE

Edward Van der Pyl, Holden, Mass., assignor to Agicide Laboratories, Inc., Racine, Wis., a corporation of Delaware No Drawing. Application November 16, 1938, Serial No. 240,792

12 Claims. (Cl. 106—200)

My invention relates to molded articles, and more particularly to the production of shaped articles made from vegetable materials.

The principal object of the invention is to make a molded article from vegetable materials comprising ingredients that are thermoplastic and capable of being softened and molded under heat and pressure.

I have discovered that vegetable shell materials, such as the shells of nuts, the endocarps of drupes, the barks of trees, the hulls of grains and seeds and the cones or strobiles of coniferous trees, comprise thermoplastic ingredients, and that they may be used as base substances which are moldable under heat and pressure either by themselves or with other thermoplastic materials, such as natural or synthetic or artificial resins or materials forming the same. These shell materials may also be employed with modifying agents which affect the hardness, strength, cohesion, wearability, resistance to abrasion and other physical properties of the molded product, or they may be employed as thermoplastic modifying agents with other moldable materials.

I prefer to use those nut shells, fruit stones, barks, grain hulls, seed shells and like bodies which are thermoplastic to such an extent that they may be consolidated and molded without the aid of other thermoplastic materials and preferably by means of moderate pressure at a comparatively low temperature, such as 1 to 20 tons pressure per square inch at 120 to 200° C. As examples of nut shells which are particularly serviceable, I may use those of the walnut, Brazil nut, hickory nut, butter nut, pistachio nut, cocoanut, pecan nut, peanut, filbert nut, acorn and other nuts of like character. I may also use various other types of materials, which are herein considered as wood or vegetable shells, such as the coffee bean, which has preferably been roasted, the shell of the cacao bean from which chocolate is made, the endocarp or outer shell covering of the stones of drupes or fruits, such as the apricot, peach, plum, olive, cherry and other similar fruits. Likewise, I may use as such vegetable shells the barks of trees, such as the poplar, oak, pine, elm, maple, birch, beech, alder and other trees and shrubs which are either deciduous or evergreen. Similarly, the hulls or outer coverings of various grains and seeds, such as wheat, oats, barley, rye and the like are sufficiently thermoplastic so that they may be compressed under heat and pressure to form a useful solid body; and these are to be considered as wood or vegetable shells within the scope of my invention.

Various methods may be employed for molding or shaping articles from the wood shells, but this is preferably accomplished by means of heat and pressure applied directly to the raw material. These shell materials are preferably crushed or ground to a small size, such as will pass through a screen having 16 or more meshes to the linear inch, and preferably to a grit size of 100 or finer; since it is easier to compress the finer sizes to the required shape. The temperature of molding is comparatively low, and it is found that a temperature of 140 to 160° C. or higher at pressures of from 1 to 20 tons per square inch will mold very satisfactory articles from the materials above listed. For example, walnut shells, after the meats have been removed, may be crushed to 100 grit size and then compressed in a steel mold in a power press which is heated by steam. A pressure of 5 tons per square inch and a temperature of about 150 to 160° C. for 10 minutes gives a molded article of a brown black color which has a density almost as high as the true density of the shell material. Similarly, the shells of pecans, filberts, Brazil nuts and cacao beans may be molded to a very dense, strong and substantially non-porous body by being pressed for 10 minutes at 160° C. under a pressure of 10 tons per square inch. The same general pressure and temperature conditions hold good for the stones of fruits, the barks of trees and the shucks or hulls of wheat, oats and other grains. Wide variations in the pressure may be made, depending on the nature of the material being molded; and the temperature may also be suitably adjusted to secure the best results, within the limits of the press and below that temperature at which the shell material is destructively affected.

The shell material looks and acts like a natural resin, to some extent, and it may be accordingly treated merely as a substance capable of being softened or plasticized under heat and pressure. Molded articles made of the nut shells as above described have a high strength and many of the favorable characteristics of synthetic resins. For example, molded walnut shell, pressed under 10 tons per square inch at about 160° C., was found to have a cross bending ruptural strength of 6000 pounds per square inch.

The resin-like shell material may also be molded in combination with plasticizers or lubricants, or with thermoplastic material or substances capable of being molded under heat and pressure, or with various agents capable of imparting desired properties to the product. The addition of 1% or 2% by weight or more of a synthetic resin, such as the potentially reactive condensation product of phenol and formaldehyde, will aid in the molding operation. For example, the pressure required to mold pulverized walnut shells at 160° C. may be 20 tons to give a desired product; whereas the addition of 2% of a potentially reactive phenol formaldehyde resinoid in the liquid or powder form will make it possible to obtain an equally satisfactory product with a pressure as low as 2 or 3 tons per square inch. Strong and dense bodies may be made of walnut shells molded with 1% or more of Canada balsam, rosin, shellac or other natural resins. Numerous other synthetic or natural resins or thermoplastic materials may be used as plasticizers or as agents for imparting desired properties to the product.

The vegetable shell distinguishes materially from standard fillers, such as wood flour or sawdust used with phenol-formaldehyde condensation products and other resins, since ordinary sawdust is not thermoplastic under the pressure and temperature conditions normally employed in the manufacture of the molded article; whereas the wood shell is thermoplastic and thus forms an integral union with any synthetic resin used therewith.

Numerous types of synthetic resins which are well known in the industry may be used with the vegetable shell material. Examples of these are polymerizable vinyl compounds, including vinyl chloride, vinyl acetate and vinyl chloroacetate, and polymerizable unsaturated methylene compounds, such as the esters of acrylic acid or alpha substituted acrylic acid, of which methyl methacrylate is an example. Combinations of such vinyl resins may also be used, such as methyl methacrylate copolymerized with methacrylic acid. I may also employ any potentially reactive fusible or heat settable resinoid, such as the condensation product of phenol and formaldehyde reacted in the presence of ammonia, or their homologues, or the phthalic glycerol types of resins, or the urea resins, or any other suitable moldable composition which is compatible with the vegetable shell material under the conditions of molding. As an example of the method of using such resins, the shell material may be wet with an aqueous solution of urea formaldehyde and then dried prior to molding. Similarly, cellulose acetate is an agent which is capable of flowing on the surface of the shell material and aiding in cementing the grains together.

I may also use various agents which act as plasticizers or lubricants, in that they aid the molding of the shell material, whether or not other thermoplastic bodies are present. For example, a small amount of water is found to lower the pressure by 50% or so for the production of a molded body of desired characteristics. For example, from 8 to 16% of water may be used with the shell material for that purpose. Too much water, however, is not desirable since the article may blister somewhat due possibly to the presence of excess steam. This water may serve as a mechanical lubricant or as a plasticizer, or its beneficial effect may possibly be due to some chemical transformation that takes place under the heat and pressure applied.

Various other types of materials may be used as plasticizers. I have found that hexamethylenetetramine in suitable proportions, such as 5 to 10% or more will serve as a hardening agent and increase the strength of the molded shell material. An appreciable hardening effect is also obtained by using 2% to 6% or more of aniline or of furfural in a 40% formaldehyde solution. Numerous other plasticizers and modifying agents well known in the resinoid art may be employed with the wood shell material. I have also observed that 2.5% to 7.5% of a 20% aqueous solution of KOH or NaOH lowers the pressure required for molding a body of given density. Numerous combinations of these different materials may be used and the proportions of these modifying agents may vary widely. It is to be noted that only a small amount of phenol or furfural formaldehyde, such as 1% to 5% by weight, is sufficient to impart a very high strength and make the body much more easily molded than if the wood shell material were used alone. A larger amount of the resin merely imparts to the molded body more of its own properties. It will be also appreciated that one may add numerous types of coloring materials for the purpose of imparting desired colors to the molded material.

If the shell material contains too much of an oil which detrimentally affects the plasticizing or molding operation, this oil may be removed prior to the molding of the body. For example, coffee may be roasted to remove surplus oil, and the roasted product will mold to form a much stronger body than does the unroasted material. If, however, the quantity of oil is not too great in a given shell material, then it may be allowed to remain. Also, one may mold the shell material with agents, such as barium carbonate or barium sulfate, which are capable of taking up the extruded oil and aiding in binding the shell material together. Cacao shells give off oil in the mold which may be initially removed by washing the material with hot water. The stones of fruits should preferably be washed with water to remove the surface sugar which does not aid in the plasticizing operation.

The molded nut shells provide a body of higher elasticity than has the reacted phenol formaldehyde condensation product, although it is not quite as hard. Hence, this characteristic makes it desirable in some instances to combine the stronger phenol formaldehyde resin with the more elastic wood shell material. The various materials that are best molded with the wood shell are those of similar resin-like characteristics, although numerous other substances may be incorporated with the wood shell material as fillers or inert bodies which provide strength, durability, wearability, abrasion resistance or other desired properties.

The vegetable shell material may be employed as a bond for numerous types of granular grains of which crystalline alumina, silicon carbide, boron carbide and diamonds are examples. This shell material serves like a resin in its bonding properties. For example, a grinding wheel or other abrasive article may be made by mixing suitable proportions of abrasive grains and the bond, such as 100 parts by weight of abrasive grains with 10 to 100 parts by weight of the shell material. These proportions may be more widely varied, if desired. This mixture of abrasive grains of suitable grit size and the shell material, preferably in a pulverized form or in the same grit size as the abrasive grains, may be placed in a mold and heated and compressed as required, such as at a temperature of 160 to 200° C. and a pressure of 1 to 20 tons per square inch. The wood shell material may also serve as a bond for numerous other commercially useful materials, such as asbestos, sand, cork, particles of wood and numerous other materials.

While the theories and the principles of chemistry and botany underlying the utility of such materials is not understood, it is believed that these wood or vegetable shells comprise cellulose, the pentosans and lignin in such proportions and of such character that a very considerable percentage of a thermoplastic ingredient is present. It is thought that the lignin and pentosans are particularly important for this purpose and are instrumental in imparting the desired properties to the crushed shell material. I have noted that a nut shell, such as walnut or pecan, when ground to a fine size and observed under the microscope, have a resin like appearance very much like a powdered synthetic resin formed as the condensation product of phenol and formaldehyde. This powdered shell material has a conchoidal fracture and is translucent or transparent. It is generally of a very light color but when molded it takes on a dark brown or black color.

In an article by Boswell found on page 971 of volume 30 (1936) of the Biochemical Journal, the analysis of a Brazil nut shell was given as follows:

| | Per cent |
|---|---|
| Benzene-soluble | 4.69 |
| Alcohol-soluble | 1.06 |
| Water-soluble | 1.64 |
| 5% NaOH (cold)-soluble | 16.00 |
| Lignin | 53.25 |
| Cellulose | 25.47 |

The cellulose fraction was found to give a high yield of furfuraldehyde, and the pentosan content of the cellulose was given as 29.3%. Boswell also gave the following analysis of peanut hulls:

| | |
|---|---|
| Water-soluble, cold | 8.5 |
| Water-soluble, hot | 9.8 |
| 1% alkali-soluble, cold | 21.5 |
| Ether-soluble | 0.5 |
| Alcohol-soluble | 3.2 |
| Pentosans | 18.5 |
| Lignin | 33.4 |
| Cellulose | 44.9 |
| Pentosans in pulp | 13.5 |

In volume 60 (1938) page 1506 of the Journal of the American Chemical Society, Ramanathan gives the following analysis of cocoanut shells which have been dried at 105° C. with a moisture loss 8.78%.

| | |
|---|---|
| Cold water soluble | 0.19 |
| Hot water soluble | 3.51 |
| Alcohol soluble | 2.51 |
| Benzene soluble | 0.27 |
| 1% Alkali soluble | 18.8 |
| Ash (mostly $K_2CO_3$) | 0.61 |
| Lignin | 36.51 |
| Cellulose | 53.06 |
| Total pentosans | 29.27 |
| Pentosans in the cellulose | 20.54 |

Pentosans form 38.69% of total cellulose.

Similarly, I have found that the walnut shell analyzes as follows:

| | |
|---|---|
| Specific gravity | 1.417 |
| Pentosan and lignin content____per cent | 63 |
| Cellulose, not over_____do | 37 |

Ordinary wood has about 20 to 30% of lignin and pentosan; hence it will be noted that the shells have a very high content of lignin and the pentosans, in comparison with the wood derived from the interior of the tree and not the bark. I have found that maple wood sawdust is not sufficiently thermoplastic to permit it to be compressed into a hard coherent body at a temperature of 160° C. and a pressure of 20 tons per square inch. On the other hand, powdered walnut shell may be compressed into a dense mass of 1.40 specific gravity (true density=1.417) by a pressure of 5 tons per square inch at a temperature of about 150° to 160° C.

While I have attempted to explain some of the theories underlying this invention, yet the claims are not to be construed as dependent thereon. Also, the examples given are to be considered as illustrating the invention and not as limitations thereon, except as set forth in the claims appended hereto. The term "vegetable shell material" and similar expressions are to be interpreted as including all of the classes of substances above defined, and particularly the shells of nuts, tree barks, fruit stone shells, grain hulls, seed shells and equivalent resin-like materials.

I claim:

1. An article of manufacture made of a resin-like substance comprising essentially a raw thermoplastic comminuted nut shell material consolidated by thermoplastic flow and shaped as a dense coherent body with heat sufficient to soften its resin content and held together by the cohesion of the resinous ingredients of the shell material.

2. An article of manufacture made of a molded substance comprising essentially a raw thermoplastic comminuted vegetable shell material having a lignin and pentosan content of at least 30% by weight and consolidated by thermoplastic flow with heat sufficient to soften the lignin and pentosan present and held together by the cohesion of the lignin and pentosan in the form of a strong, coherent resin-like mass having a conchoidal fracture and a density near that of the raw material.

3. An article of manufacture comprising a molded resin-like substance, at least 90% of which is a raw thermoplastic comminuted vegetable shell material having a lignin and pentosan content materially greater than 30% by weight and being consolidated by thermoplastic flow of said material and shaped as a dense coherent body with heat sufficient to soften the lignin and pentosan present and held together by the cohesion of the lignin and pentosan.

4. An article of manufacture made of a molded substance comprising essentially a raw thermoplastic comminuted vegetable shell material intimately associated with a small amount of a moldable resin to intensify the binding action of the shell material, said shell material and resin being consolidated and shaped by thermoplastic flow as a dense strong coherent body with heat sufficient to soften the shell material and held together by the cohesion of the thermoplastic ingredients of the shell material and the moldable resin.

5. An article of manufacture made of a molded substance comprising an intimate mixture of at least 90% by weight of a raw thermoplastic comminuted vegetable shell material having a lignin and pentosan content of more than 30% by weight, and a small amount of a moldable resin, said resin and shell material being each consolidated by thermoplastic flow and shaped as a dense strong coherent body having a conchoidal fracture with the aid of heat sufficient to soften the lignin and pentosan present in the shell material and held together by the cohesion of the lignin, pentosan and moldable resin.

6. A molding composition suitable for shaping by thermoplastic flow comprising essentially a comminuted nut shell in admixture with a small amount of plasticizer.

7. A molding composition suitable for shaping by thermoplastic flow comprising essentially a comminuted shell material substantially free of tannin and containing more than 30% by weight of chemically unaltered lignin and pentosan as the principal binding agent in admixture with a small amount of a plasticizer.

8. A molding composition suitable for shaping by thermoplastic flow comprising essentially comminuted pecan shell in admixture with a small amount of a plasticizer.

9. A molding composition suitable for shaping by thermoplastic flow comprising an intimate mixture of at least 90% by weight of a raw thermoplastic comminuted vegetable shell material substantially free from tannin and having an unaltered lignin and pentosan content of more than 30% by weight as binder and not over 10% by weight of a plasticizer for said unaltered lignin and pentosan binder.

10. An article of manufacture made of a resin-like substance comprising essentially a raw thermoplastic comminuted vegetable shell material consolidated by thermoplastic flow, and shaped as a dense coherent body under heat between 120° and 200° C. sufficient to soften the resin content of said vegetable shell material and held together by its resin content.

11. An article of manufacture made of a resin-like substance comprising essentially a raw thermoplastic comminuted shell material as the predominant ingredient and a moldable resin as the minor ingredient consolidated by thermoplastic flow and shaped as a dense coherent body with heat sufficient to soften the resinous content of the shell material and held together by the cohesion of the resinous ingredients of the shell material and the moldable resin.

12. A molded composition comprising essentially a raw thermoplastic comminuted vegetable shell material constituting more than 50% of the composition intimately associated with a smaller amount of a moldable resin to intensify the binding action of the shell material, said shell material and resin being consolidated and shaped by thermoplastic flow as a dense strong coherent body with heat sufficient to soften the resin like content of the shell material and held together by the cohesion of the thermoplastic ingredients of the shell material and the moldable resin.

EDWARD VAN DER PYL.